Figure 1:
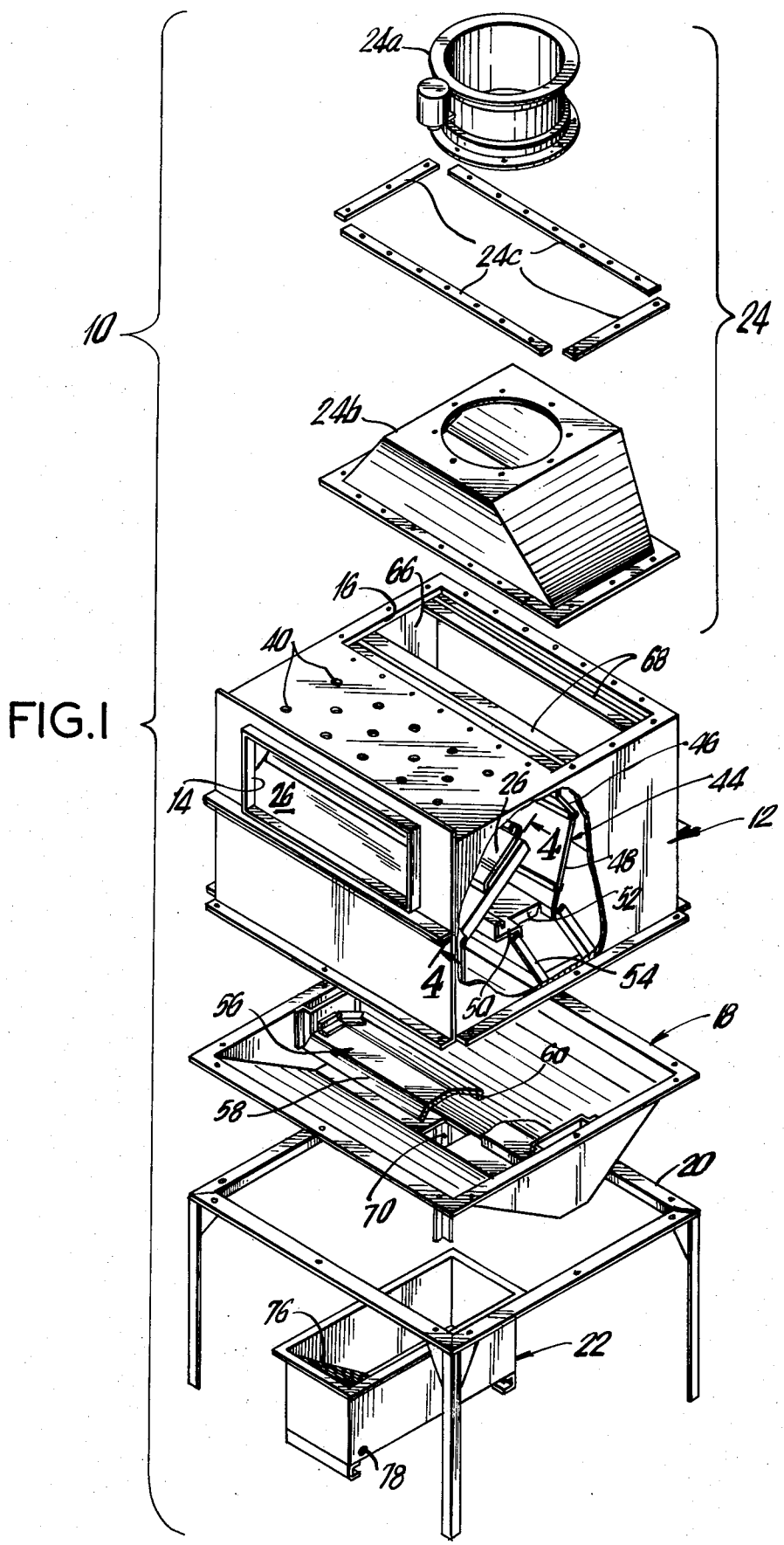

United States Patent [19]

Boon

[11] 4,227,895
[45] Oct. 14, 1980

[54] AIR SCRUBBER APPARATUS

[75] Inventor: Bruce T. E. Boon, Wayne, N.J.

[73] Assignee: Eastern Cyclone Industries, Inc., Fairfield, N.J.

[21] Appl. No.: 40,752

[22] Filed: May 21, 1979

[51] Int. Cl.³ .......................................... B01D 45/10
[52] U.S. Cl. ..................................... 55/226; 55/228; 55/229; 55/241; 55/238
[58] Field of Search ................. 55/DIG. 36, 228, 238, 55/229, 241, 226

[56] References Cited

U.S. PATENT DOCUMENTS

| | | | |
|---|---|---|---|
| 1,879,107 | 9/1932 | Couch | 55/238 |
| 2,004,467 | 6/1935 | Hawley | 55/229 |
| 2,788,954 | 4/1957 | Paasche | 55/228 |
| 2,807,450 | 9/1957 | Gordon | 55/238 |
| 3,093,468 | 6/1963 | Krochta | 55/238 |
| 3,192,689 | 7/1965 | Smith | 55/229 |
| 3,339,344 | 9/1967 | Pallinger | 55/226 |
| 3,591,947 | 7/1971 | Sexton | 55/226 |
| 3,807,143 | 7/1975 | Dunn | 55/229 |
| 3,893,831 | 2/1975 | Doane | 55/DIG. 36 |
| 3,920,425 | 11/1978 | Grantham | 55/238 |
| 3,964,886 | 6/1976 | Engalitcheff, Jr. et al. | 55/228 |
| 4,022,118 | 5/1977 | Vandas | 55/DIG. 36 |
| 4,071,019 | 1/1978 | King | 55/238 |
| 4,103,676 | 8/1978 | Kastner | 55/DIG. 36 |

Primary Examiner—Tim R. Miles
Attorney, Agent, or Firm—Anthony J. Casella

[57] ABSTRACT

An air scrubber apparatus is provided for removing particles or fumes from an air stream. The apparatus first saturates the air stream with a liquid and then passes the air stream through a tortuous path defined by an arrangement of three internal baffles. The air stream impinges on two baffles which separate the liquid-particulate agglomeration from the air stream, after which it is directly channeled to a hopper while being shielded from the air stream. Another baffle is provided as a partition between the air flow and the hopper area to inhibit the reabsorption of particles by the air stream. The hopper is of V-shaped configuration which is effective in reducing the turbulence of the air flow around the base of the apparatus. In addition, the V-shaped hopper can accommodate more than one liquid filtering device. The subject apparatus may be provided with an adjustable baffle adjacent the air intake opening and adjustable vanes adjacent the air exhaust opening for varying the negative pressure created by the flow of air through the apparatus.

12 Claims, 4 Drawing Figures

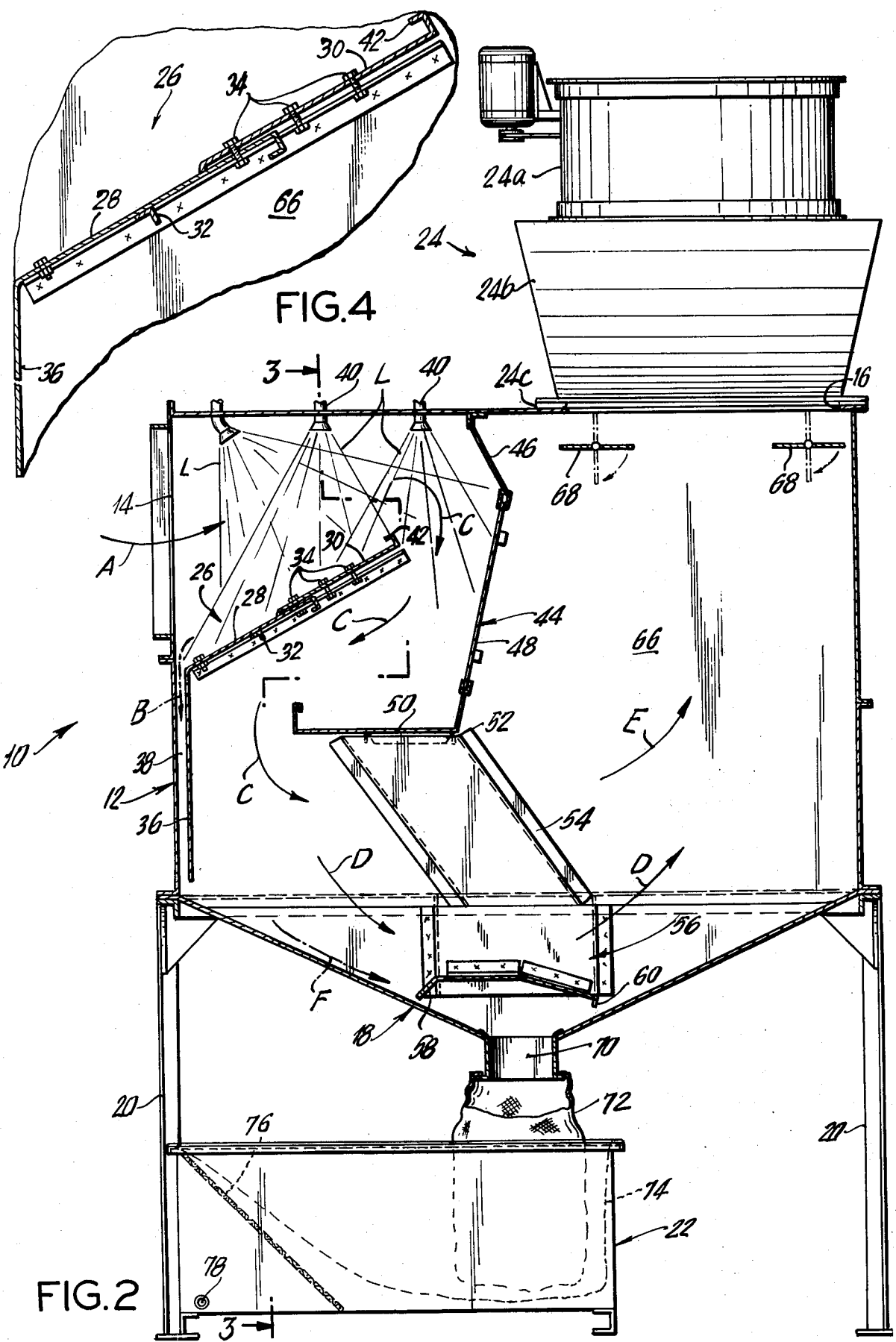

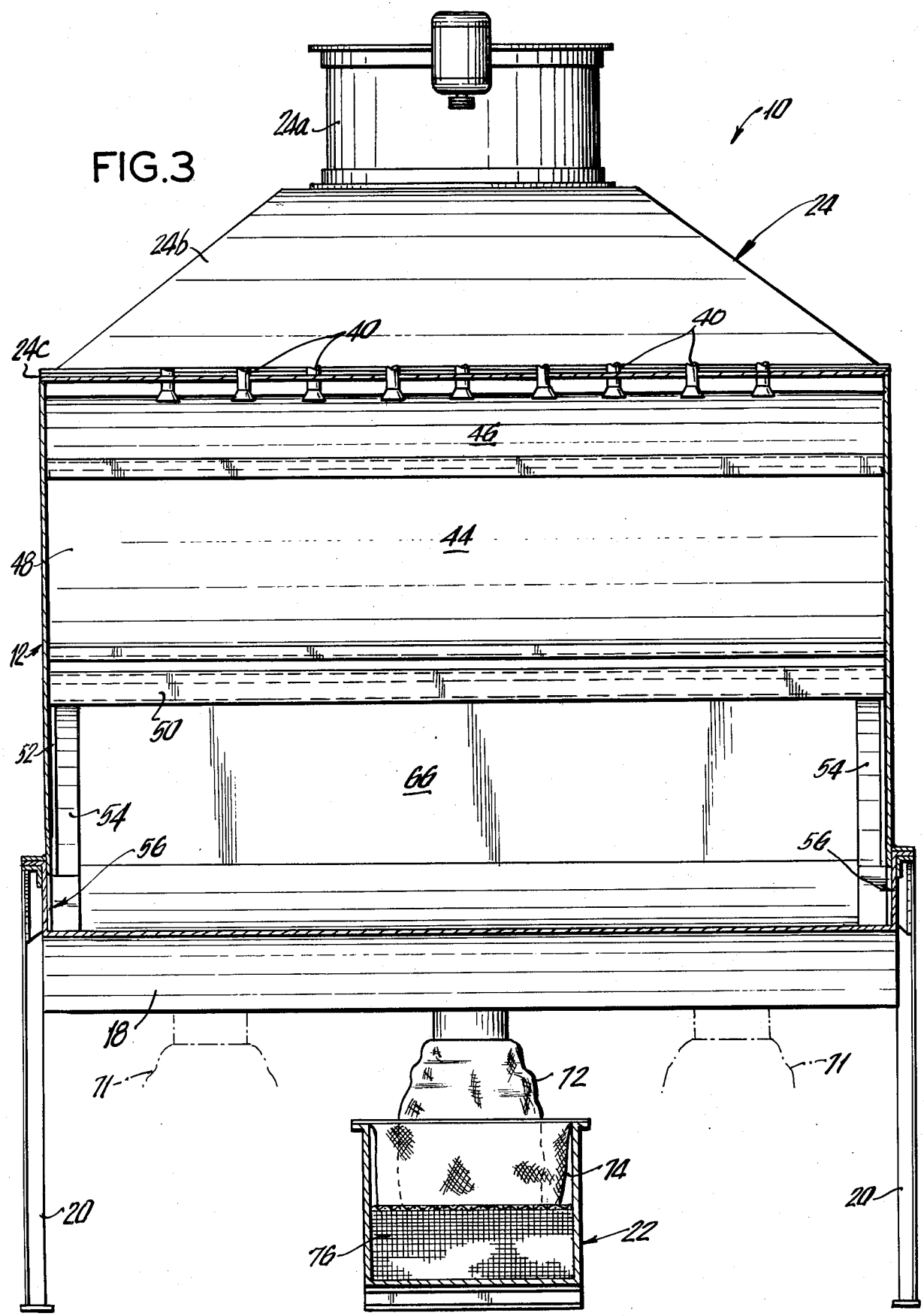

AIR SCRUBBER APPARATUS

BACKGROUND OF THE INVENTION a. Field of the Invention

The subject invention relates to a new and improved air scrubber apparatus for removing particles and fumes from an air stream. More particularly, an apparatus is provided which first saturates the air stream to form a liquid-particulate agglomeration and then draws the air stream through a tortuous path defined by an arrangement of three baffles which function to separate the agglomeration from the air stream. The subject invention also includes a new and improved hopper which reduces turbulence of the air stream and is capable of accommodating a plurality of filtering devices for separating the particulates from the liquid.

b. Description of the Prior Art

As an example of the use of an air scrubber apparatus, during the drying of textiles the tumbling action caused by the rotating drums of the dryers results in small lint particles being shorn free of the materials, which are then carried away in the hot air exhaust. In large industrial applications, it has been found that a separate apparatus must be provided to remove the lint particles from the air stream prior to venting the air stream to the atmosphere. Original attempts to "scrub" the air involved simply passing the lint-laden air stream through filters to collect the lint particles. This method was not entirely satisfactory in that the collected lint occupied large amounts of space and, in addition, created a fire hazard. Further, as the filter became increasingly clogged with lint particles the drawing efficiency or "negative pressure" created by the scrubbing or collector apparatus would decrease. Maintaining a constant negative pressure relative to the dryers is necessary because if the drawing pressure of the lint collector apparatus is too small, the air stream will not be properly pulled through the lint collector and the lint will not be removed. On the other hand, if the negative pressure is too large, the hot air is drawn out of the dryers before it has a chance to dry the textiles, thus decreasing the efficiency of the dryers and increasing heating and operating costs. To alleviate these drawbacks, one form of prior art air scrubber or lint collector separates the air stream as it enters the collector apparatus, such that the lint particles are trapped in the liquid and thus form an agglomeration. The collector apparatus then separates the liquid-lint agglomeration from the air stream, so that the agglomeration can be filtered. This system was advantageous in that the moistened lint occupies a much smaller volume, and since it was moist, it created no fire hazard. In addition, since the air flow is not required to pass through filters, a constant negative pressure relative to the dryers could be substantially maintained.

Prior art liquid air scrubbers separate the liquid-lint agglomeration from the air stream by causing the air stream to impinge on a central baffle within the housing of the collector apparatus. The impingement of the air flow on the baffle results in a portion of the liquid-lint agglomeration being trapped by the baffle where it subsequently runs down into a collecting pan or hopper. It was found, however, that the baffle arrangement in the prior art apparatus could not effectively remove enough of the liquid-lint agglomeration as was necessary to provide adequate scrubbing of the air stream.

Another shortcoming of the prior art apparatus is that the water which cascades down the baffle towards the hopper could be reabsorbed by the air flow before it was filtered. More particularly, the hopper found in prior art devices, which defines the bottom of the housing, is generally of a truncated inverted pyramidal configuration, thus allowing the liquid-lint agglomeration to flow downwardly towards a central opening, where a filtering means is located. Thus, the inverted truncated pyramidal configuration provides only one collection point for the liquid-lint agglomeration. Hence, the prior art device could accommodate only one filtering means which must be frequently attended to. In addition, as the air stream passes over the inverted truncated pyramidal configuration, a great deal of turbulence results, which had the effect of stirring up the liquid-lint agglomeration collected in the hopper, thus causing some of the lint particles to be reabsorbed into the air stream and thus decreasing the efficiency of the apparatus.

Another shortcoming of the prior art apparatus relates to the physical distance between the lint removing device and the dryers. This distance directly affects the amount of drawing force or negative pressure which must be created by the apparatus for efficient operation. Since the distance from the dryers to the prior art device varies with different customers, the required negative pressure was found to be difficult to achieve since only minor variations in the negative pressure could be obtained by means of altering the fan speed of the prior art device.

Accordingly, considering the shortcomings of the prior art devices, it is among the objects of the subject invention to provide an apparatus for removing particulates from an air stream which has a baffle arrangement which effectively removes a liquid-particulate agglomeration from an air stream.

It is a further object of the subject invention to provide an apparatus for removing particulates from an air stream which has a new and improved hopper design that will reduce the turbulence of the air flow.

It is another object of the subject invention to provide an apparatus for removing particulates from an air stream which has a hopper design which can accommodate more than one filtering means for the liquid-particulate agglomeration.

It is still a further object of the subject invention to provide an apparatus for removing particulate from an air stream which includes a means for adjusting the negative pressure created by the apparatus.

Another object of the subject invention is to provide an apparatus for removing particulates from an air stream which isolates the trapped liquid-particulate agglomeration from the air stream as it runs down towards the hopper to prevent reabsorption of the particles.

It is still a further object of the subject invention to provide an apparatus for removing particulates from an air stream which inhibits the reabsorption of particles by the air stream as it flows past by the liquid-particulate agglomeration collected in the hopper.

SUMMARY OF THE INVENTION

In accordance with these and other objects, the subject invention provides an air scrubber apparatus for removing particulates from an air stream with a new and improved baffle arrangement and hopper configuration. More particularly, the air scrubber apparatus of the subject invention includes a housing with an air intake opening on one side thereof and an air exhaust opening disposed on the other side of the housing. The housing includes a hopper which defines the bottom of the housing and is of V-shaped configuration. The V-shaped configuration of the hopper is effective in reducing the turbulence of the air flow as it passes by the hopper, thereby minimizing the reabsorption of particulates from the liquid collected in the hopper. In addition, the V-shaped configuration of the hopper can accommodate more than one filtering means, which reduces the need for frequent maintenance of the apparatus and cleaning of the filtering means.

The subject apparatus includes three internal baffles arranged so as to guide the air flow in a tortuous path through the housing where the liquid-particulate agglomeration is removed. More particularly, a first baffle is provided adjacent to the air intake opening and at an angle thereto. Directly above the first baffle, nozzles are situated which spray a liquid onto the incoming air stream to saturate the air stream in order to create the liquid-particulate agglomeration. A portion of the saturated air stream impinges on the first baffle such that a portion of the liquid-particulate agglomeration becomes trapped on the first baffle and cascades downwardly toward the hopper. A passageway is provided at the bottom of the first baffle to directly channel the liquid-particulate agglomeration to the hopper, thus isolating the agglomeration from the air flow and inhibiting the reabsorption of the particulates.

A second baffle is provided adjacent the first baffle and is disposed central to the housing and consists of a partition portion and a trough portion. The partition portion extends vertically downwardly to a point intermediate the height of the housing. The trough portion is connected to the bottom edge of the partition portion and is disposed perpendicular thereto. The second baffle performs the dual function of changing the direction of the air flow, while supplying a second impingement surface. When the air flow strikes the second baffle, it experiences an essentially 180° change of direction. Since the air flow can change its direction faster than the liquid particulate agglomeration, another portion of the agglomeration is trapped by the second baffle and removed from the air stream. The trough portion collects the agglomeration as it runs down the partition portion. The trough portion extends across the entire width of the housing and has openings along its edges which are in communication with a pair of conduits which empty directly into the hopper. Thus, the liquid-particulate agglomeration separated by the second baffle is routed directly to the hopper and isolated from further contact with the air stream which inhibits reabsorption of particulates. A portion of the first baffle overhangs a portion of the trough so that the first and second baffles cooperate to cause the air stream to flow in a tortuous S-shaped path providing the maximum impingement of the air stream to efficiently separate the liquid-particulate agglomeration therefrom. The air stream is then further twisted around a tortuous path towards the air exhaust opening at the rear upper portion of the housing. In this final stage, the air stream is drawn upwardly through a large volume which causes the air to expand, and thus decrease in velocity which, in turn, permits any remaining moist particles to fall under the influence of gravity into the hopper. Hence, the arrangement in the subject invention effectively provides for a three stage removal of the liquid-particulate agglomeration from the air stream.

In addition, means are provided for adjusting the negative pressure created by the subject air scrubber apparatus so that the latter may be readily adapted to each individual installation. More particularly, the first baffle is inclined at an angle to the horizontal and cooperates with the housing of the apparatus to effectively define a venturi through which the air stream passes. The first baffle is adjustable in length such that a large portion of the air intake opening can be variably restricted for reducing the air flow and the negative pressure created by the apparatus. In addition, adjustable vane members are provided adjacent the air exhaust opening for adjusting the negative pressure created by the apparatus.

The subject apparatus is also provided with a third baffle which is disposed directly above the apex of the V-shaped hopper. The third baffle acts as a fairing or partition between the hopper and the air flow to inhibit the reabsorption of the liquid-particulate agglomeration back into the air flow. The third baffle is preferably disposed such that the distance between the hopper and the front edge of said third baffle adjacent the air intake opening is smaller than the distance between the hopper and the opposed edge of the third baffle, thereby inhibiting the flow of air from passing under the third baffle and into contact with the liquid-particulate agglomeration. The spacing along the front edge of the third baffle is sufficient to allow the liquid-lint agglomeration to run from the conduit of the first baffle into the apex of the hopper.

DESCRIPTION OF THE DRAWINGS

FIG. 1 is an exploded perspective view of the apparatus of the subject invention;

FIG. 2 is a cross-sectional side view of the apparatus of the subject invention;

FIG. 3 is a cross-sectional view of the subject invention, taken along the line 3—3 of FIG. 2; and FIG. 4 is a cross-sectional view of the first baffle of the subject invention, taken along the line 4—4 of FIG. 1.

DESCRIPTION OF THE PREFERRED EMBODIMENT

Although the subject invention will be described with reference to an application for removing or scrubbing lint particles from an air stream, it should be understood that the invention may also be employed in other applications for removing various types of particulate matter or fumes from an air stream.

Referring to FIG. 1, the lint collecting apparatus of the subject invention is designated by the numeral 10 and includes a generally rectangular housing 12 which includes an air intake opening 14 and an air exhaust opening 16. The bottom of housing 12 is defined by a generally V-shaped hopper 18 and rests on a stand 20 with a filter tank 22 located below and communicating with hopper 18. An exhaust fan assembly 24, including fan 24*a*, tapered chamber 24*b*, and sealing strips 24*c*, is provided on top of housing 12 and in communication with the air exhaust opening 16. Air exhaust opening 16 and exhaust fan assembly 24 may be disposed along the rear wall of housing 12 when necessary to meet the requirements of a particular installation.

A first baffle 26 is provided adjacent the air intake opening 14 and extends the entire width of housing 12.

As more particularly illustrated in FIG. 4, first baffle 26 is disposed from the horizontal at an angle ranging from 15°–45°. The first baffle 26 consists of a fixed section 28 and a movable or adjustable section 30 such that the length of the first baffle 26 may be adjusted by extending or retracting the movable section 30. The latter is fixed to the section 28 by means of wing nuts 34 or any other suitable fastening means. Fixed section 28 is reinforced by stiffeners 32. An inner wall member 36 is connected to the bottom end of fixed section 28 of the first baffle 26, and is disposed parallel to and cooperates with the front wall of housing 12 to form a passageway 38, as shown in FIG. 2. Passageway 38 extends from the bottom of first baffle 26 and terminates at the hopper 18.

A hot air stream, indicated by arrow A, which is laden with lint particles (not shown) initially enters the housing 12 through air intake opening 14. The air stream is then saturated by a liquid L which is sprayed from nozzles 40. Preferably, nozzles 40 are arranged in staggered rows of four or five nozzles, and each nozzle provides a spray pattern which will fully saturate the air flow A. The liquid L combines with the lint particles of the air stream to form a liquid-particulate agglomeration. In operation, as the air stream enters the housing it is saturated by the liquid spray and a portion of the saturated air stream impinges on first baffle 26 which functions to separate the liquid-particulate agglomeration from the air stream. As indicated by arrow B, the liquid-particulate agglomeration cascades down the first baffle 26 and into passageway 38 where it is channeled to hopper 18. By this arrangement, the inner wall member 36 functions to isolate the liquid-particulate agglomeration from the air stream within the housing and thus prevents reabsorption of the particulates into the air stream, as more fully described hereinafter.

Adjustment of the length of the first baffle 26 provides a means by which the amount of negative pressure produced by apparatus 10 can be regulated. As the length of the first baffle 26 is increased, the air intake opening 14 becomes obstructed thereby reducing the negative pressure generated by the apparatus 10. As noted above, a fixed negative pressure created by the apparatus must be maintained at an optimum level in order to produce maximum efficiency, thereby reducing operating cost of the apparatus.

The free end of adjustable section 30 of the first baffle 26 is provided with a hook-shaped lip or projection 42, as illustrated more particularly in FIG. 4. It has been found that since the air stream enters the housing 12 at a high velocity, it tends to cause any liquid which has accumulated at the end of the first baffle 26 to be carried off into the air flow. The hook-shaped projection 42 is provided to prevent the air stream from reabsorbing or carrying the liquid beyond the end of the first baffle 26. Thus, the liquid-particulate agglomeration trapped by the lip 40 on the section 28 runs down the baffle 26 and into passageway 38.

A second baffle 44 extends the entire width of housing 12, and consists of upper 46 and lower 48 planar members, and trough 50. Upper planar member 46 is fixedly connected to the top of housing 12 and extends downwardly and rearwardly therefrom, while lower planar member 48 is connected to the bottom of upper planar member 46 and extends downwardly and forwardly with respect to housing 12. Trough 50 is connected to the bottom of the lower planar member 48 and is disposed generally horizontal. Preferably, lower planar member 48 is removably connected to trough 50 and upper planar member 46 by slide mountings so that lower planar member 48 may be easily removed to facilitate maintenance of the apparatus including first baffle 26 and nozzles 40. Trough 50 is provided with openings 52 disposed on opposed edges thereof, as most clearly illustrated in FIG. 1. Openings 52 communicate with conduits 54 which are spot welded to the opposed side ends of housing 12 and extend downwardly to the hopper 18.

In operation, after the air stream passes first baffle 26, second baffle 44 causes the air stream to change its direction approximately 180° so it follows a tortuous path through housing 12, as indicated by arrow C. More particularly, the baffles are arranged so that first baffle 26 overhangs second baffle 48 such that a tortuous S-shaped path is formed which the air stream must follow. When the high speed air stream impinges on second baffle 44, it is able to change direction faster than the liquid-particulate agglomeration such that the liquid-particulate agglomeration impinges on and is trapped by second baffle 44 and is caused to run down panel members 46 and 48 into the trough portion 50. The liquid-particulate agglomeration is then channeled through openings 52 and the side wall conduits 54 to hopper 18. It is noted that the vertical flange forming a portion of the trough 50 effectively functions as a wall or additional impinging baffle for the airflow as it reverses its direction, thereby aiding in removal of the liquid-particulate agglomeration.

The hopper 18 has a V-shaped configuration, as clearly illustrated in FIG. 1. As indicated by arrow D, after the air stream passes second baffle 44 it is redirected by inner wall member 36 towards the rear of housing 12. The V-shaped configuration of hopper 18 aids in reducing air turbulence created by the hopper and enables an essentially laminar flow path for the air flow. By reducing the amount of turbulence in and around the hopper area, the reabsorption of particles from the liquid-particulate agglomeration collected in the hopper is inhibited. To further minimize the potential for the liquid-particulate agglomeration to be reabsorbed by the air stream, a third baffle 56 is provided and extends across the width of hopper 18. Third baffle 56 functions as a divider separating the air stream from the liquid-particulate agglomeration collected in the hopper. Further, the spacing between hopper 18 and the leading edge 58 of the third baffle 56 is preferably smaller than the spacing between the hopper 18 and the trailing edge 60 of said third baffle 56. This configuration is effective in restricting the air stream from passing underneath the third baffle 56, thereby inhibiting the reabsorption of particles from the liquid-particulate agglomeration.

After the air stream passes through the passageway defined by the bottom of trough 50 and third baffle 56, it is drawn into the rear open volume 66 of housing 12, as indicated by arrows E. As the air stream enters open volume 66, it expands and thus its velocity decreases, such that remaining particles descend by gravity into hopper 18. The air stream is finally drawn out of apparatus 10 through air exhaust opening 16 by fan member 24.

To further facilitate the adjustment of the negative pressure created by air scrubber apparatus 10, adjustable vanes 68, 68 may be provided, with each vane being pivotally mounted adjacent the air exhaust opening 16. In operation, each adjustable vane 68, 68 may be pivoted about a central axis to effectively vary the size of the air exhaust opening 16 leading to tapered housing 24b. By adjusting the size of the air exhaust opening 16, the amount of negative pressure created by the air scrubber apparatus 10 may be further regulated, thereby facilitating the creation of optimum pressure conditions to create maximum efficiency of the apparatus.

In order to maximize the total amount of particulates removed from the air stream by the time it exits the apparatus 10, it is necessary to severaly limit the reabsorption of the liquid-particulate agglomeration by the air stream after it has been initially separated therefrom. To reduce the likelihood of reabsorption, the apparatus 10 isolates the liquid-particulate agglomeration which has been separated from the air stream from further contact with the air stream. More particularly, passageway 38 which is defined by the cooperation between inner wall member 36 and the front wall of housing 12 functions to isolate the liquid-particulate agglomeration separated by first baffle 26 from the air stream as it cascades down towards the hopper 18. Thus, the air stream, as indicated by arrow D, which passes by the outer surface of inner wall member 36 does not come into contact with the liquid-particulate agglomeration and therefore reabsorption is inhibited. In addition, conduits 54 are provided along the opposed side edges of housing 12 to channel the liquid-particulate agglomeration separated by second baffle 44 directly to hopper 18 so that the air stream passing under trough section 50 will not reabsorb the particles therefrom. By preventing the reabsorption of particles by the air stream, the efficiency of the apparatus 10 is greatly increased.

In operation, the liquid-particulate agglomeration is collected in hopper 18 from passageway 38, conduits 54, and from rear open area 66. It is noted that the spacing between hopper 18 and the leading edge of third baffle 58 must be sufficient to allow the liquid-particulate agglomeration from passageway 38 to run down into the apex of the V-shaped hopper (see arrow F). An opening 70 is provided at the apex of the V-shaped hopper as an exit point for the liquid-particulate agglomeration such that lint or particles may be filtered from the liquid-particulate agglomeration. The configuration of hopper 18, in addition to reducing the turbulence of the air stream, functions to accommodate the addition of more than one filtering device. As illustrated by phantom lines 71 in FIG. 3, due to the V-shaped configuration of the hopper 18 a plurality of filtering devices can be provided along the bottom linear apex of hopper 18. This arrangement is advantageous due to the fact that since filter bags need periodic servicing, an increase in the number of filtering devices will reduce the frequency of maintenance checks.

The preferred filtering device of the subject invention consists of a three filter system including a primary filter bag 72, a secondary filter bag 74 and a filter screen 76, all housed within filter tank 22. The liquid-particulate agglomeration is first passed through a fine mesh primary filter bag 72 where a high percentage of the lint particles is filterred from the agglomeration. A large secondary filter bag 74, having a mesh at least as fine as primary filter bag 72, totally surrounds the primary filter bag to additionally separate lint particles from the agglomeration. The secondary filter bag 74 is large enough so that the liquid flow will not be impeded as the bag fills with lint particles. In addition, a screen 76 is provided as a final means for trapping any lint particles remaining in the liquid. Preferably after the liquid has been filtered, it is recirculated through vent 78 back to nozzles 42 to saturate the subsequent air stream entering the air scrubber apparatus 10.

Accordingly, there is provided a new and improved apparatus for removing particulates from an air stream. More particularly, the subject apparatus provides a new and improved three baffle arrangement which can effectively remove large portions of particulates from an air stream. As the air stream enters the housing 12 through the air intake opening 14, it is saturated by a liquid L to form a liquid-particulate agglomeration. The air stream is then caused to impinge on an adjustable first baffle 26 which separates a portion of the liquid-particulate agglomeration from the air stream. The liquid-particulate agglomeration is then channeled directly to the hopper section 18 via a passageway 38, thus shielding the agglomeration from the downstream air stream and inhibiting reabsorption of the particles. The air stream is drawn through a tortuous S-shaped path defined by the cooperation of the first and second baffles 26, 44. The air stream impinges on the second baffle 44 and another portion of the liquid-particulate agglomeration is separated therefrom. The agglomeration is directly channeled via a pair of conduits 54 from the collecting trough 50 of the second baffle 44 to the hopper 18 to thus inhibit the reabsorption of the particles. In addition, a third baffle 56 is provided as a fairing or partition between the air stream and the hopper section 18 to further inhibit the reabsorption of particles by the air stream. The air stream is then drawn around into a rear open area 66 where it expands and slows, thereby allowing any of the remaining liquid-particulate agglomeration to fall back into the hopper 18. The new and improved V-shaped hopper is effective in reducing the turbulence of the air stream around the base of the apparatus 10 which, in turn, reduces the reabsorption of particulate from the liquid collected in the hopper 18. In addition, the new and improved V-shaped hopper 18 can accommodate more than one filtering means which thereby reduces the need for frequent maintenance. The apparatus of the subject invention further provides means to adjust the negative pressure created by the apparatus. The means includes the adjustable first baffle 26 which can be extended to reduce the size of the air intake opening and thus restrict the amount of air flow passing therethrough. Further, adjustable vanes 68, 68 are provided adjacent the air exhaust opening 16 for obstructing that opening and reducing the air flow therethrough. A fan means 24 is provided adjacent the air exhaust opening 16 to draw the air stream through the housing 12 of the apparatus 10.

Although the subject apparatus has been described by reference to a preferred embodiment, it will be apparent that many other modifications could be derived by those skilled in the art that would fall within the spirit and scope of the present invention as defined by the appended claims.

What is claimed is:

1. An apparatus for removing particulate from an air stream comprising:
   a housing, said housing having an air intake opening and an opposed air exhaust opening, said housing further including a hopper defining the bottom of said housing, said hopper being of V-shaped configuration;
   means for saturing said air stream with a liquid as it enters said housing for agglomerating said air stream particles with said liquid;

a first baffle disposed adjacent said air intake opening, and an inner wall member connected to the bottom edge of said first baffle and disposed parallel to and cooperating with a wall of said housing thereby forming a passageway, wherein the saturated air stream impinges on said first baffle and a portion of said liquid-particulate agglomeration is trapped by said first baffle and is channeled directly into said hopper through said passageway;

a second baffle including a partition section and a trough section, said partition section disposed intermediate and extending generally vertically downwardly from the top of said housing to a point intermediate the height of said housing, said trough section being connected to the bottom end of said partition section and including a pair of conduits in communication with said hopper and disposed along opposed end walls of said housing, with said first baffle being spaced from and overhanging said trough section of said second baffle to create a tortuous S-shaped path for said air stream with said partition section functioning to define a rear open area of relatively large volume adjacent said air exhaust opening;

a third baffle disposed directly above the apex of said V-shaped hopper acting as a divider to inhibit the air stream from reabsorbing said liquid-particulate agglomeration collected in said hopper; and means for drawing said air stream into said housing, through said tortuous S-shaped path, said rear open area and out said exhaust opening, whereby the saturated air stream passing said first baffle impinges on said partition section of the second baffle such that another portion of said liquid-particulate agglomeration is trapped by said second baffle and channeled directly to said hopper by said conduits, and whereby after said saturated air stream passes said partition section of said second baffle, the path of said air stream is twisted such that it passes underneath said trough section and above said third baffle and thereafter is further twisted and drawn into said rear open area where said air stream expands such that particulates are removed by gravity from said air stream.

2. An apparatus for removing particulate from an air stream as recited in claim 1 wherein the spacing between said hopper and the edge of said third baffle adjacent said air intake opening is less than the spacing between said hopper and the opposed edge of said third baffle whereby said third baffle functions to restrict the air stream from passing between said third baffle and said hopper thereby preventing the reabsorption of said liquid-particulate agglomeration.

3. An apparatus for removing particulate from an air stream as recited in claim 1 wherein said first baffle is fixedly connected to opposed side walls of said housing and extends upwardly therefrom at an angle ranging from 15°–45° to the horizontal thereby restricting the passage of the air stream entering the apparatus.

4. An apparatus for removing particulate from an air stream as recited in claim 1 wherein said first baffle further includes a hook-shaped lip disposed on the upper edge thereof to prevent liquid-particulate agglomeration trapped by said first baffle from being carried passed said first baffle by said air stream.

5. An apparatus for removing particulate from an air stream as recited in claim 1 wherein the means for drawing said air stream through said housing is an exhaust fan disposed adjacent said air exhaust opening.

6. An apparatus for removing particulate from an air stream as recited in claim 1 wherein the means for saturating said air stream is a plurality of spray nozzles disposed inside said housing adjacent said air intake opening and pivotally connected to the top side of the housing.

7. An apparatus for removing particulate from an air stream as recited in claim 1 wherein said partition section of said second baffle is defined by a rearwardly inclined upper planar member and a forwardly inclined lower planar member, said lower planar member being removable to facilitate the maintenance of said apparatus.

8. An apparatus for removing particulate from an air stream as recited in claim 1 further including a means for adjusting the amount of air flow being drawn through said housing.

9. An apparatus for removing particulate from an air stream as recited in claim 8 wherein the means for adjusting the air stream drawn through said housing is a plurality of pivotally mounted vanes disposed within said housing adjacent said air exhaust opening such that said vanes may be pivoted to partially cover said exhaust opening thereby restricting the air stream drawn through said housing.

10. An apparatus for removing particulate from an air stream as recited in claim 8 wherein the means for adjusting the air stream drawn through said housing includes the first baffle which is adjustable in length such that the air intake opening may be restricted to reduce the air stream drawn through said housing.

11. An apparatus for removing particulate from an air stream as recited in claim 1 further including a means for filtering said particles from said liquid-particulate agglomeration such that particles may be removed from said apparatus and said liquid can be recirculated back to said saturation means.

12. An apparatus for removing particulate from an air stream as recited in claim 11 wherein said filtering means includes a primary filter bag and a secondary filter bag surrounding said first filter bag through which said liquid-particulate agglomeration is passed whereby said particles are filtered from said liquid-particulate agglomeration by said filter bags.

* * * * *